US007423659B1

(12) United States Patent  (10) Patent No.: US 7,423,659 B1
Pratley et al.  (45) Date of Patent: Sep. 9, 2008

(54) METHOD AND SYSTEM FOR UTILIZING VOID REGIONS IN COMPUTER-GENERATED AREAS OF TEXT

(75) Inventors: Christopher H. Pratley, Seattle, WA (US); Alex J. Simmons, Seattle, WA (US); Owen C. Braun, Seattle, WA (US); Peter L. Engrav, Seattle, WA (US); Stuart J. Stuple, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/184,184

(22) Filed: Jun. 27, 2002

(51) Int. Cl.
G09G 5/00 (2006.01)
G06F 17/00 (2006.01)
(52) U.S. Cl. ...................... 345/660; 715/223
(58) Field of Classification Search ................ 345/620, 345/467–472.3, 660; 715/517, 518, 223, 715/246
See application file for complete search history.

(56) References Cited

U.S. PATENT DOCUMENTS

| 4,739,477 | A | * | 4/1988 | Barker et al. ................ 707/100 |
| 5,438,659 | A | * | 8/1995 | Notess et al. ............... 715/505 |
| 5,495,577 | A | * | 2/1996 | Davis et al. ................ 715/542 |
| 5,500,931 | A | * | 3/1996 | Sonnenschein ............. 715/529 |
| 5,689,717 | A | * | 11/1997 | Pritt ........................... 715/512 |
| 5,764,797 | A | * | 6/1998 | Adcock ...................... 382/187 |
| 5,805,170 | A | * | 9/1998 | Burch ......................... 345/619 |
| 6,073,147 | A | * | 6/2000 | Chan et al. .................. 715/542 |
| 6,081,816 | A | * | 6/2000 | Agrawal ...................... 715/521 |
| 6,205,452 | B1 | * | 3/2001 | Warmus et al. ............. 715/500 |
| 6,298,154 | B1 | * | 10/2001 | Cok ........................... 382/186 |
| 6,697,825 | B1 | * | 2/2004 | Underwood et al. ........ 715/530 |
| 6,742,162 | B2 | * | 5/2004 | Bennett ...................... 715/503 |
| 6,826,727 | B1 | * | 11/2004 | Mohr et al. ................. 715/517 |
| 6,868,524 | B1 | * | 3/2005 | Fushiki et al. .............. 715/529 |
| 7,028,258 | B1 | * | 4/2006 | Thacker et al. ............. 715/525 |
| 2002/0065849 | A1 | * | 5/2002 | Ferguson et al. ............ 707/513 |
| 2002/0073121 | A1 | * | 6/2002 | Sano et al. .................. 707/517 |
| 2002/0152240 | A1 | * | 10/2002 | Kitainik et al. ............. 707/517 |
| 2003/0128234 | A1 | * | 7/2003 | Brown et al. ................ 345/744 |

OTHER PUBLICATIONS

Microsoft Word 2000 (Copyright (c) 1983-1999.*
Microsoft® Word 2000Copyright © 1983-1999.*

* cited by examiner

*Primary Examiner*—Ryan R Yang
(74) *Attorney, Agent, or Firm*—Perkins Coie LLP

(57) ABSTRACT

A method and system are provided for inserting an object in a void region in an existing object. A user locates the void region by determining whether the insertion point for the object is outside of an edit region. If the insertion point is outside of the edit region, the user is in a void region. The user then inserts the object in the void region. The size of the void region dynamically changes based on the size of the inserted object. The object may be inserted using a computer keyboard or a pen. The inserted object may be text, ink, or any other type of object.

14 Claims, 4 Drawing Sheets

METHOD AND SYSTEM FOR UTILIZING VOID REGIONS IN COMPUTER-GENERATED AREAS OF TEXT

FIELD OF INVENTION

The present invention relates to a method and system for utilizing void regions in computer-generated areas of text.

BACKGROUND OF THE INVENTION

Computer software applications allow users to create a variety of documents for work, education, and leisure. For example, word processing applications allow users to create letters, articles, books, memoranda, and the like. Such applications have a number of well-known strengths, including rich editing and formatting. In recent years, use of such computer software applications has been expanded to include traditional desktop computers, laptop computers, and a variety of handheld electronic devices, including handheld personal computers, and personal digital assistants. Moreover, in recent years, a variety of data input methods have been created to include keyboard entry and handwriting recognition entry. In a typical handwriting recognition entry system, a user is allowed to handwrite data directly onto the display screen of a computing device, using a pen or stylus, as a method of data entry.

A number of existing software applications use objects to contain a flowing region of text within a defined area (frequently referred to as "text boxes"). Typically these objects can be moved and resized, and in some cases interact intelligently with other objects (for example, flowing around a separate picture object). These objects, however, invariably occupy a fixed amount of rectangular space within the region leaving the remainder of the region as empty or void space. Furthermore, the entry of additional data anywhere within the region is restricted to the flowing text region and thus limits the data entry experience of the user. For example, in pen computing scenarios, it is much more natural for a user to simply write in empty space anywhere on a page, such as when writing on a piece of paper.

Thus, there is a need for a method and system of utilizing empty or void regions in computer-generated areas of text to allow a user to input objects anywhere in these areas without regard for flowing text regions to address the foregoing problems.

SUMMARY OF THE INVENTION

Illustrative embodiments of the present invention satisfy the above described needs by providing a method and system for utilizing void regions in computer-generated areas of text.

In one embodiment, the present invention provides a method for inserting an object in a void region. A user locates the void region by determining whether the insertion point for the new object is outside of an edit region (the areas already containing content) but still within the region of the existing object (the text box). If the insertion point is outside of the edit region, the user is in a void region. The user then inserts the object in the void region. The size of the void region dynamically changes based on the size of the inserted object. The object may be inserted using a computer keyboard or a pen. The inserted object may be text, ink, or any other type of object.

These and other features, advantages, and aspects of the present invention may be more clearly understood and appreciated form a review of the following detailed description of the disclosed embodiments and by reference to the appended drawings and claims.

DETAILED DESCRIPTION OF ILLUSTRATIVE EMBODIMENTS

Figure 1:
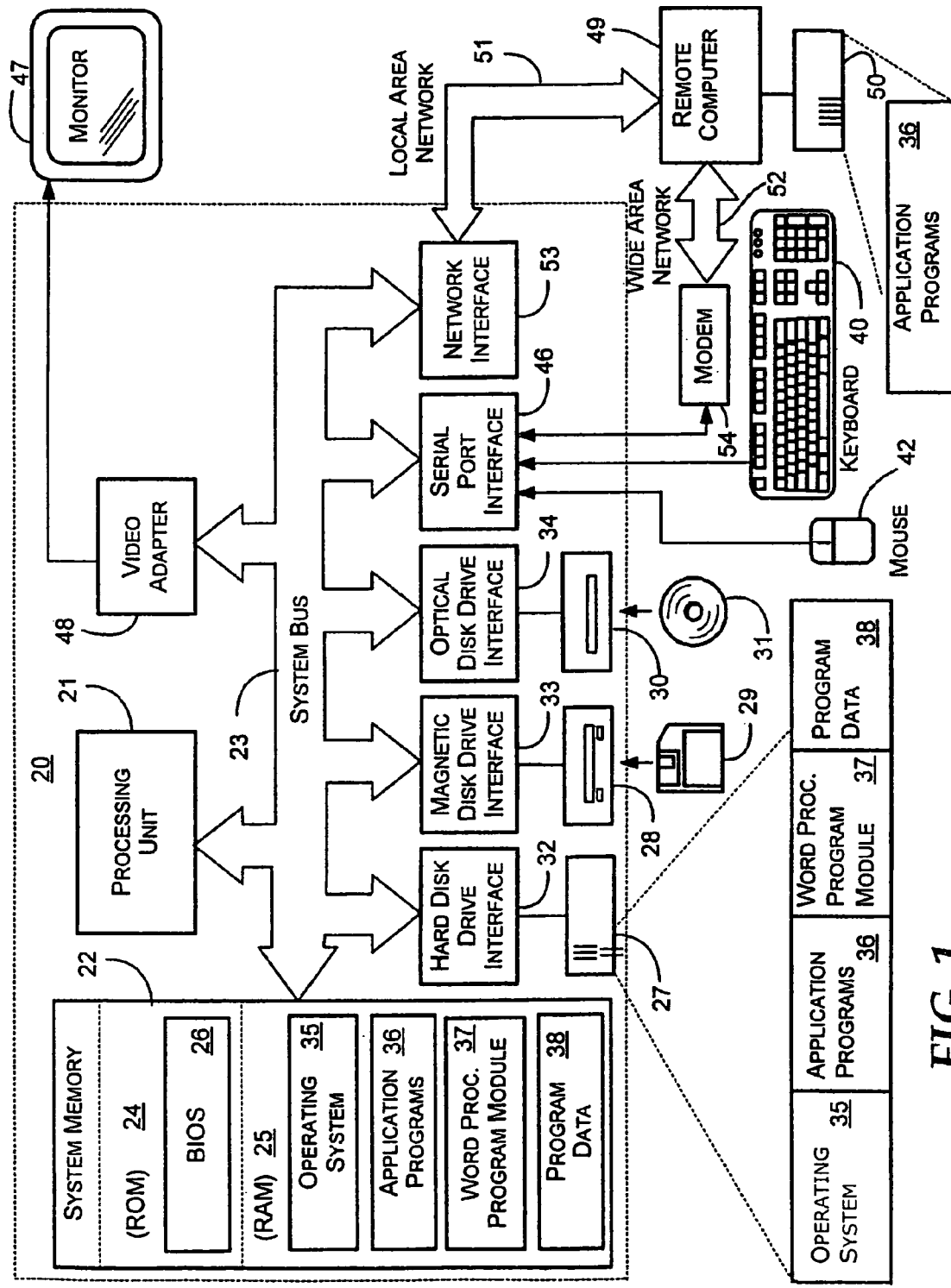
FIG. 1 is a block diagram of a computer that provides the exemplary operating environment for the present invention.

Referring now to the drawings, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or other type of program module), program data 38, and other program modules (not shown).

A user may enter commands and information into the personal computer 20 through a keyboard 40 and pointing device, such as a mouse 42. Other input devices (not shown) may include a pen, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
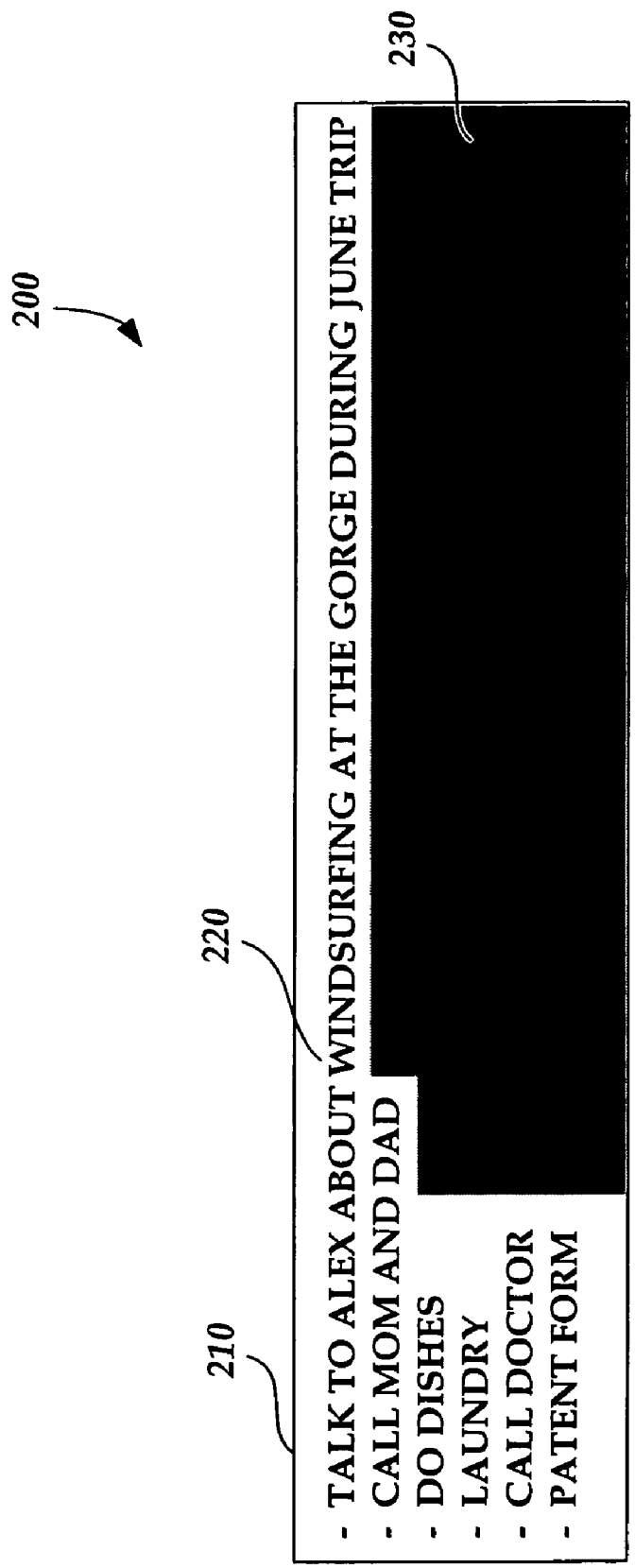
FIG. 2 is an illustration of a display of a void region in a computer-generated text box according to an embodiment of the present invention.

FIG. 2 is an illustration of a display 200 of a void region in a text box 210 according to an embodiment of the present invention. The text box may be created in a computer application program such as a word processor. As shown in FIG. 2, text box 210 contains several lines of flowing text 220 and a shaded area which is void region 230. As will be described in more detail with respect to FIG. 3 below, void region 230 allows a user to insert an object anywhere within the void region without overlapping the boundaries formed by the existing edit region. The inserted object may be additional text or a picture object (such as clipart) that may be inserted into the void region 230 using any of various input means such as a keyboard or a pen.

Figure 3:
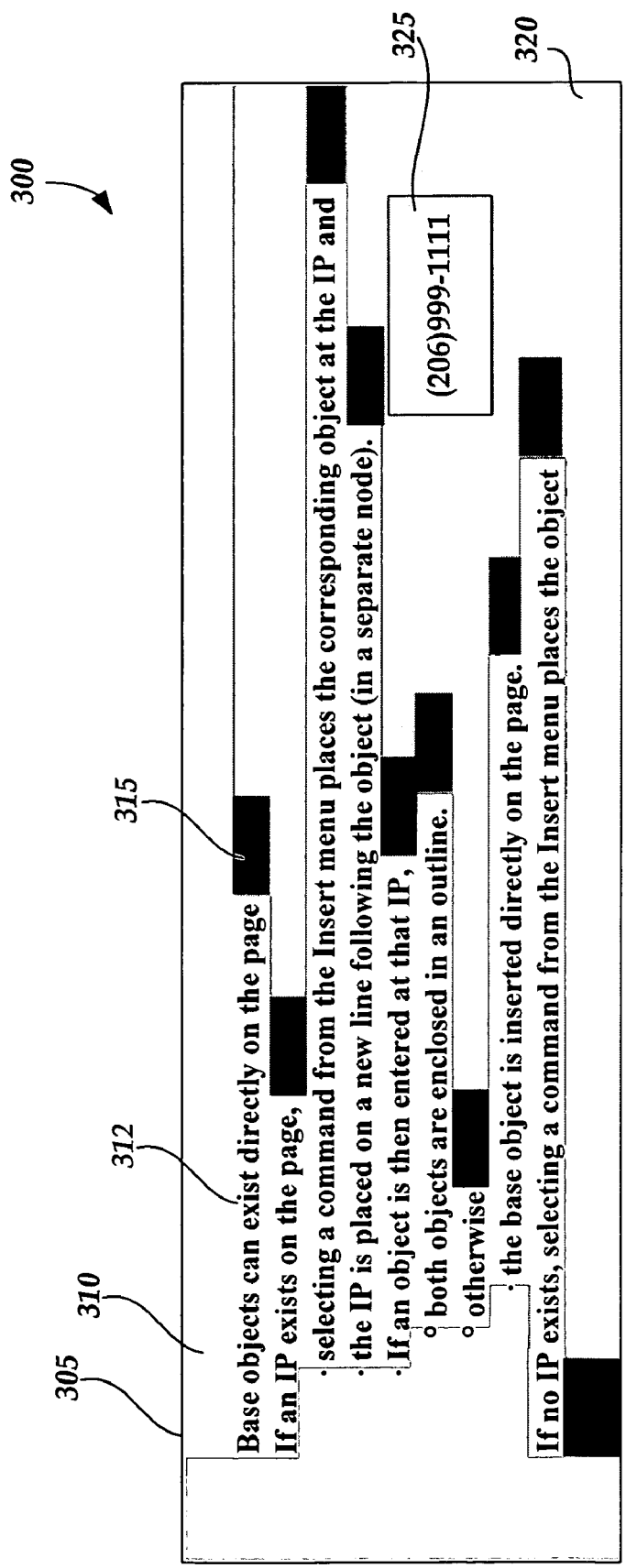
FIG. 3 is an illustration of a display showing an object in the void region of a computer-generated text box according to an embodiment of the present invention.

FIG. 3 is an illustration of a display 300 showing a computer-generated text box 310 having a void region according to an embodiment of the present invention. As shown in FIG. 3, text box 305 includes edit regions 310. Each edit region 310 contains a line of text bounded by rectangular box 312 having a height and a width. Each edit region 310 also includes an insert area 315. Insert area 315 allows the insertion of additional text so as to extend the length of the rectangular box in edit region 310. The size of each edit region 310 is dynamic. That is, as text is inserted or removed, the width of the edit region increases or decreases accordingly. In one embodiment, each box of an edit region 310 has a maximum width before text is word-wrapped to a new line. For example, if an edit region has a six-inch word-wrap width, text entered into the box exceeding six inches will be word-wrapped to a new line in the edit region.

Void region 320 is the area outside of the edit regions 310 (i.e., rectangular box 312 and insert area 315) in the text box 305. The size and shape of void region 320 is also dynamic. That is, the size of the void region may increase or decrease depending on the size of each edit region 310 or on the size of objects inserted into the void region. For example, if an object larger than the boundaries of the current void region is inserted, the width of edit regions 310 will decrease (and if necessary word-wrap the included text) to provide room for the inserted object. An object inserted into void region 320 remains a separate object. For example, object 325 in the void region in FIG. 3 is a telephone number surrounded by a text box created when the object was inserted. The text box in the void region is independent of the text boxes in edit regions 310. Objects inserted into void region 320 may include text or picture objects such as drawings, clipart, etc. The objects may be inserted by using a keyboard or by using a pen through the use of handwriting recognition software. Those skilled in the art will appreciate that any of a number of additional means for inputting data into a computer-generated area of text may also be utilized.

Figure 4:
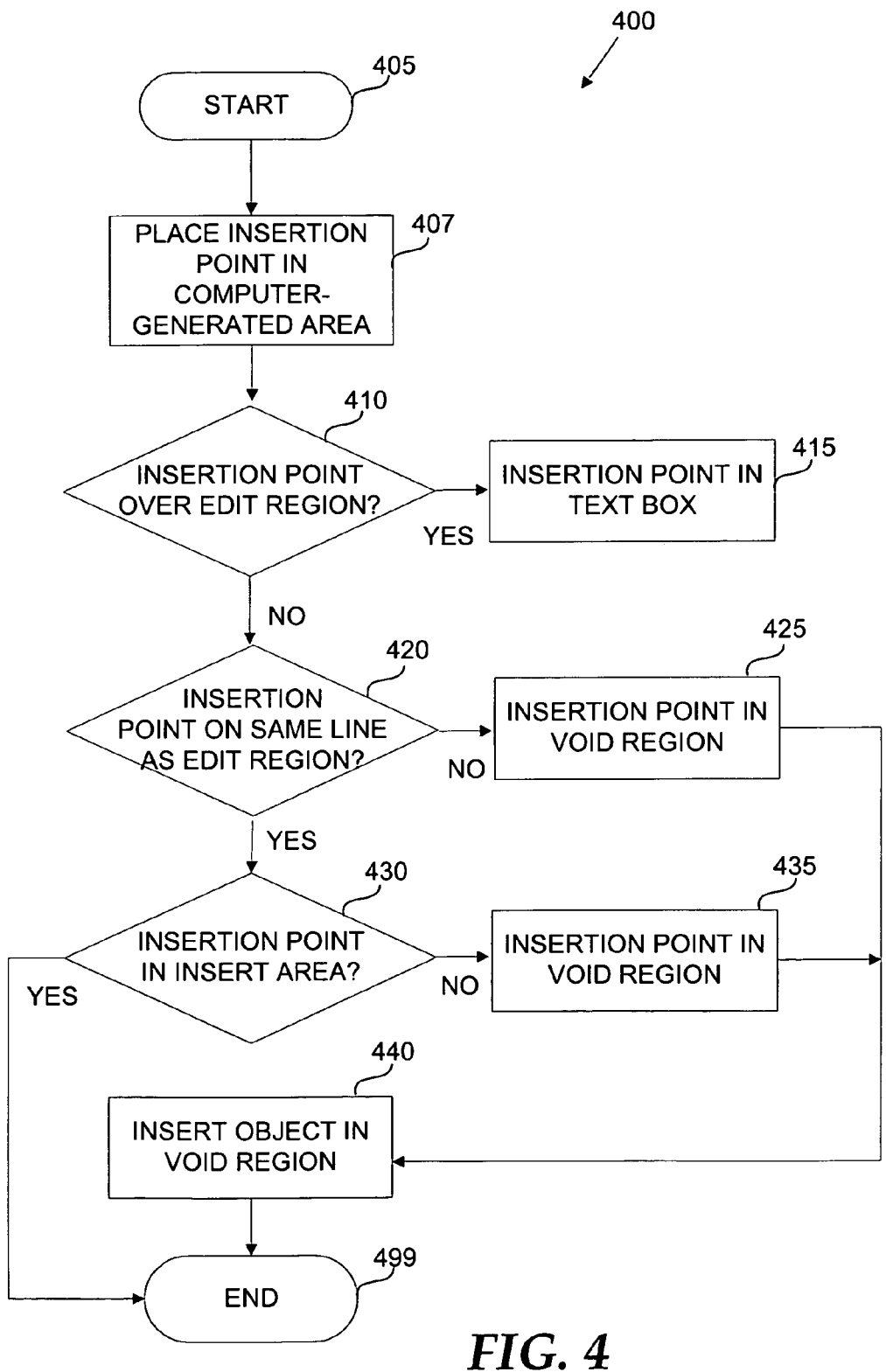
FIG. 4 is a flow chart illustrating a method for inserting an object in the void region of a computer-generated text box.

FIG. 4 is a flow chart illustrating a method 400 for inserting an object in the void region of a computer-generated text box such as the one illustrated in FIGS. 2 and 3 above. Referring to FIG. 4, the method 400 begins at start step 405 and proceeds to step 407 where a user places an insertion point for the object in the computer-generated text box. It should be understood that in the computer system of the exemplary operating environment illustrated in FIG. 1, the insertion point might be graphically represented by a cursor or by a pen depending on the method of input. The method then continues to step 410.

At step 410, the user determines the location of the insertion point. If the insertion point is over an edit region the cursor or pen will be in a text box (step 415) such as text box 305 in FIG. 3. If the insertion point is not in a text box the method then continues to step 420.

At step 420, the user determines whether the insertion point is on the same horizontal line as an edit region. If the insertion point is not on the same line, then the insertion point is in a void region (step 425). If the insertion point is on the same line as an edit region, the method continues to step 430.

At step 430, the user determines whether the insertion point in an insert area adjacent to an edit region. If the insertion point is in an insert area, the user will be able to add text to the text box in the adjacent edit region. If the insertion point is not in an insert area, the user is in a void region (step 435) and the method continues to step 440.

At step 440, if the insertion point is in a void region as determined from either step 425 or step 435, the user may insert the object in the void region. The method then ends at step 499.

Embodiments of the present invention allow a user to input text or picture objects in computer-generated text boxes regardless of the location of existing text regions on the page. Thus, the user is able to place objects wherever they are desired on a page. Users are more apt to make use of the empty space in front of them, especially in pen computing applications because of its similarity to writing on paper.

Although the illustrative embodiments of the present invention have been described as implemented in a word processing program module, it should be understood that the present invention may be implemented in other program modules, including, but not limited to programs such as the "OFFICE" program module, marketed by Microsoft Corporation of Redmond, Wash.

Although the present invention has been described above as implemented in illustrative embodiments, it will be understood that alternative embodiments will become apparent to those skilled in the art to which the present invention pertains without departing from its spirit and scope. Accordingly, the scope of the present invention is defined by the appended claims rather than the foregoing description.

We claim:

1. A method in a computer system for editing a word processing document having text boxes, the method comprising:
   displaying on a display device the text boxes of the word processing document, the text boxes each having one or more edit regions, wherein an edit region includes an insertion area and text bounded by a rectangular box having a height and a width, and wherein the insertion area allows for an insertion of text by extending the width of the rectangular box of the edit region; and
   in response to receiving from a user a selection of a location on the display device,
      determining whether the selected location is within a void region of the word processing document, wherein a void region is any area of the word processing document that is outside of an edit region within the text boxes;
      when the selected location is not within a void region of the word processing document, entering an edit mode so that the user can edit the text within the selected edit region; and
      when the selected location is within a void region of the word processing document,
         inserting a new text box at the selected location, the newly inserted text box being independent of the other text boxes, wherein when the newly inserted text box is larger than the void region, decreasing the width of at least one edit region of a text box so that the newly inserted text box does not overlap the boundaries of the at least one edit region; and
         entering an edit mode so that the user can enter text for the newly inserted text box
   so that new text boxes can be inserted at any location on the display device that is a void region of the word processing document.

2. The method of claim 1 wherein when the newly inserted text box is larger than the void region, decreasing width of a displayed text box to provide room for the newly inserted text box.

3. The method of claim 1 wherein the text of the newly inserted text box is handwritten by the user.

4. The method of claim 1 wherein the text of each text box is word wrapped independently.

5. The method of claim 1 provided by a pen computing application.

6. A system having a display device and a pointing device for performing a method of editing a document having text boxes, the method comprising:
   displaying on the display device the text boxes of the document, the displayed text boxes each having a plurality of edit regions, wherein an edit region comprises text bounded by a rectangular box having a height and a width; and
   in response to detecting a location of the pointing device on the display device,
      determining whether the detected location is within an edit region of one of the displayed text boxes;
      when the detected location is within an edit region of one of the displayed text boxes, entering an edit mode,
         in response to an insertion of text in the edit region, increasing the width of the rectangular box of the edit region, the edit region having a maximum width such that the text of the edit region is word-wrapped when the width of the rectangular box equals the maximum width of the edit region;
         in response to a deletion of text from the edit region, decreasing the width of the rectangular box of the edit region; and
      when the detected location is not within an edit region of one of the displayed text boxes,
         inserting a new text box at the detected location, the newly inserted text box being independent of the other text boxes; and
         entering an edit mode
   so that new text boxes can be inserted at any location on the display device that is not within an edit region of the displayed text boxes.

7. The system of claim 6 wherein an area not near text of an edit region of a displayed text box is a void region.

8. The system of claim 7 wherein when the newly inserted text box is larger than the void region, decreasing width of a displayed text box to provide room for the newly inserted text box.

9. The system of claim 6 wherein the pointing device is a stylus.

10. The system of claim 6 wherein text is entered into the newly inserted text box.

11. The system of claim 10 wherein the text of the newly inserted text box is handwritten by a user using the pointing device.

12. The system of claim 6 wherein the text of each text box is word wrapped independently.

13. The system of claim 6 wherein an object is entered into the newly inserted text box.

14. The system of claim 13 wherein the object is a picture object.

* * * * *